N. GAROFF.
LEVELING DEVICE FOR PHOTOGRAPHIC CAMERAS.
APPLICATION FILED JULY 31, 1918.
1,357,704.
Patented Nov. 2, 1920.
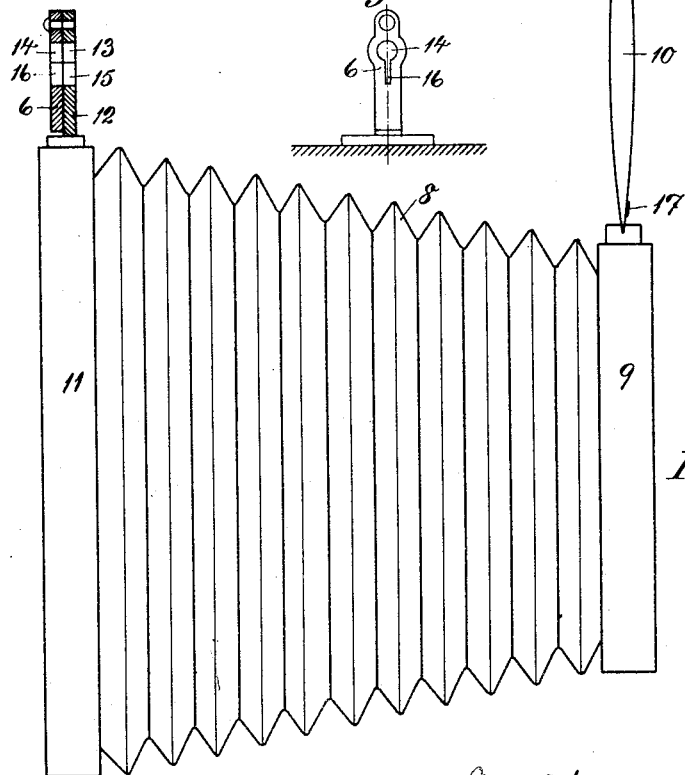

UNITED STATES PATENT OFFICE.

NIKOLAI GAROFF, OF HELSINGFORS, FINLAND.

LEVELING DEVICE FOR PHOTOGRAPHIC CAMERAS.

1,357,704.  Specification of Letters Patent.  Patented Nov. 2, 1920.

Application filed July 31, 1918. Serial No. 247,582.

*To all whom it may concern:*

Be it known that I, NIKOLAI GAROFF, engineer, a citizen of Finland, residing at Helsingfors, Finland, have invented certain new and useful Improvements in Leveling Devices for Photographic Cameras, of which the following is a specification.

The present invention has for its object a device by means of which photographic cameras may be held level.

For this purpose hitherto water levels have been used, but by employing the present invention a simpler device is established for such cases, where a great accuracy is not necessary. The device preferably is combined with the usual finder arrangement for pointing the camera at the object to be photographed, whereby the advantage is gained, that the camera is held level simultaneously as the same is pointed at the object.

The invention is applicable to finder devices with mirror, reflecting an image of the object to the eye of the photograph, as well as to finder devices, in which the camera is pointed at the object by means of sighting through a hole.

Figure 1 on the accompanying drawing shows in vertical section a finder device with mirror, and Fig. 2 shows an end view of the same. Fig. 3 shows in side view with certain parts in section a photographic camera with a device for pointing the camera at the object by sighting through a hole, and Fig. 4 is a front view of said sighting device.

In Figs. 1 and 2, 1 indicates the lens of the finder, 2 the mirror, by means of which an image of the object is reflected through the pane 3 to the eye of the photographer in the usual manner. According to the invention a substantially straight pendulum rod 6 is suspended in front of the lens 1 upon a pin 5 or the like on the frame 4 of the finder, so as to bisect the image thrown by the lens on the mirror, said pendulum rod acting as a plum. Said pendulum always occupies a vertical position in different positions of the camera, on which the finder is applied in the usual manner.

On the upper side of the frame 4 or on the pane 3 an index 7 is provided, said index 7 being placed in advance in such a manner, that the image of the pendulum, located in the pane 3, falls on the index 7, when the photographic camera is held level. According to the construction shown the pendulum 6 is suspended in the vertical plane through the center of the lens 1, which arrangement however is not necessary.

When using the camera this latter is held in such a position in the direction toward the object, that the image of the pendulum 6 falls on the index 7, in which position the camera occupies its level position.

Figs. 3 and 4 illustrate a modification, the former showing a camera in side elevation with my improvement as modified applied thereto, the finder frame and pendulum or plumb being in vertical section, and Fig. 4 showing these latter parts in detail rear elevation.

For this purpose on the front part 9 of the bellows 8 a lens 10 is fixed, opposite to the center of which a frame 12 with a hole 13 is secured at the rear part of said bellows 8, through which hole 13 the object can be observed when pointing the camera at the object.

According to the invention a pendulum 6 is suspended on said frame, said pendulum being provided with a hole 14, preferably of the same size and form as the hole 13; the pendulum 6 is placed in such a manner, that the holes 13 and 14 coincide, when the camera is held in its right level position. According to the construction each hole 13 and 14 is provided with a slit 15, 16, said slits being arranged in such a manner, that they transmit light, when the camera is held level.

The pendulum may also be suspended in front of or behind the lens 10, whereby an index 17 is provided on the lower part of the lens or its frame, with which the pendulum coincides, when the camera is held level.

Having now described my invention and set forth how the same is to be performed what I claim is:

1. In a finder for a photographic camera, a frame in combination with a lens arranged vertically therein, a pendulum rod suspended from said frame in front of said lens so as to bisect the sight through the latter, a mirror also attached to said frame and arranged to receive the image of said rod therefrom and reflect the same through the top of said frame, and an index attached to the latter, said frame being provided at the top with a window for the operator and said index extending over the window so as to indicate the proper leveling of the instrument by its coincidence with the reflected image of the rod.

2. In a finder for photographic cameras, a lens and an index arranged in planes at an angle to each other, a substantially straight pivoted rod arranged before said lens in the line of light and acting as a plumb, and a mirror arranged to receive the image of the said rod from the said lens and reflect the same to coincide with the said index when the instrument is properly leveled.

In testimony whereof I have signed my name to this specification in the presence of two subscribing witnesses.

NIKOLAI GAROFF.

Witnesses:
C. NORMAN,
C. FABRICIUS HANSEN.